US010929049B2

(12) United States Patent
Kronrod et al.

(10) Patent No.: US 10,929,049 B2
(45) Date of Patent: Feb. 23, 2021

(54) MINIMIZING RECOVERY TIME AFTER A HIGH AVAILABILITY EVENT IN A LARGE-SCALE STORAGE SYSTEM

(71) Applicant: EMC IP Holding Company LLC, Hopkinton, MA (US)

(72) Inventors: Svetlana Kronrod, Concord, MA (US); Xiangping Chen, Sherborn, MA (US); Yuval Harduf, Yehud (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 105 days.

(21) Appl. No.: 16/380,087

(22) Filed: Apr. 10, 2019

(65) Prior Publication Data

US 2020/0326856 A1 Oct. 15, 2020

(51) Int. Cl.
*G06F 3/06* (2006.01)

(52) U.S. Cl.
CPC .............. *G06F 3/065* (2013.01); *G06F 3/067* (2013.01); *G06F 3/0611* (2013.01); *G06F 3/0632* (2013.01); *G06F 3/0644* (2013.01)

(58) Field of Classification Search
None
See application file for complete search history.

(56) References Cited

U.S. PATENT DOCUMENTS

| | | | |
|---|---|---|---|
| 7,475,124 | B2 | 1/2009 | Jiang et al. |
| 8,327,103 | B1 | 12/2012 | Can et al. |
| 8,380,928 | B1 | 2/2013 | Chen et al. |
| 8,429,346 | B1 | 4/2013 | Chen et al. |
| 8,515,911 | B1 | 8/2013 | Zhou et al. |
| 8,539,148 | B1 | 9/2013 | Chen et al. |
| 8,566,483 | B1 | 10/2013 | Chen et al. |
| 8,583,607 | B1 | 11/2013 | Chen et al. |
| 8,683,153 | B1 | 3/2014 | Long et al. |
| 8,712,976 | B1 | 4/2014 | Chen et al. |

(Continued)

OTHER PUBLICATIONS

U.S. Appl. No. 15/499,943, filed Apr. 28, 2017, Kucherov et al.

(Continued)

*Primary Examiner* — Michael Alsip
(74) *Attorney, Agent, or Firm* — Daly, Crowley, Mofford & Durkee, LLP

(57) ABSTRACT

In one aspect, minimization of recovery time after a high availability (HA) event in a storage system is provided. An aspect includes creating, during an active replication session, mini replication session MOM objects from replication session-related configuration information of the active replication session, and creating mini volume objects for volumes of the active replication session, Upon determining an occurrence of the HA corresponding to the data module, an aspect includes reconfiguring the mini replication session MOM objects and the mini volume objects prior to activation of the data module and prior to enabling input/output (TO) servicing by the data module. An aspect further includes performing non-replication IO-related configuration for the data module and, upon completion of the non-replication IO-related configuration, enabling the IO servicing by the data module. Subsequent to enabling the IO servicing by the data module, an aspect also includes loading and reconstructing remaining replication session-related configuration.

18 Claims, 6 Drawing Sheets

(56) References Cited

U.S. PATENT DOCUMENTS

| | | | |
|---|---|---|---|
| 8,775,388 | B1 | 7/2014 | Chen et al. |
| 8,782,324 | B1 | 7/2014 | Chen et al. |
| 8,799,601 | B1 | 8/2014 | Chen et al. |
| 8,909,887 | B1 | 12/2014 | Armangau et al. |
| 8,930,746 | B1 | 1/2015 | Chen et al. |
| 8,954,699 | B1 | 2/2015 | Chen et al. |
| 8,977,812 | B1 | 3/2015 | Chen et al. |
| 9,152,336 | B1 | 10/2015 | Chen et al. |
| 9,208,162 | B1 | 12/2015 | Hallak et al. |
| 9,304,889 | B1 | 4/2016 | Chen et al. |
| 9,355,112 | B1 | 5/2016 | Armangau et al. |
| 9,384,206 | B1 | 7/2016 | Bono et al. |
| 9,395,937 | B1 | 7/2016 | Si et al. |
| 9,449,011 | B1 | 9/2016 | Chen et al. |
| 9,459,809 | B1 | 10/2016 | Chen et al. |
| 9,460,102 | B1 | 10/2016 | Bono et al. |
| 9,477,431 | B1 | 10/2016 | Chen et al. |
| 9,513,814 | B1 | 12/2016 | Can et al. |
| 9,529,545 | B1 | 12/2016 | Bono et al. |
| 9,542,125 | B1 | 1/2017 | Chen |
| 9,594,514 | B1 | 3/2017 | Bono et al. |
| 9,684,593 | B1 | 6/2017 | Chen et al. |
| 9,710,187 | B1 | 7/2017 | Si et al. |
| 9,811,288 | B1 | 11/2017 | Chen et al. |
| 9,817,766 | B1 | 11/2017 | Si et al. |
| 10,082,959 | B1 | 9/2018 | Chen et al. |
| 10,095,428 | B1 | 10/2018 | Meiri et al. |
| 10,152,381 | B1 | 12/2018 | Shvaiger et al. |
| 10,176,046 | B1 | 1/2019 | Hu et al. |
| 10,235,066 | B1 | 3/2019 | Chen et al. |
| 10,235,068 | B2 | 3/2019 | Eberhard et al. |
| 10,248,623 | B1 | 4/2019 | Chen et al. |
| 10,261,853 | B1 | 4/2019 | Chen et al. |
| 10,310,951 | B1 | 6/2019 | Chen et al. |
| 10,324,640 | B1 | 6/2019 | Chen et al. |
| 10,338,851 | B1 | 7/2019 | Kronrod et al. |
| 10,353,616 | B1 | 7/2019 | Tao et al. |
| 10,359,968 | B1 | 7/2019 | Chen et al. |
| 10,374,792 | B1 | 8/2019 | Meiri et al. |
| 10,394,485 | B1 | 8/2019 | Chen et al. |
| 10,402,283 | B1 | 9/2019 | Chen et al. |
| 10,409,493 | B1 | 9/2019 | Kucherov et al. |
| 10,459,632 | B1 | 10/2019 | Chen et al. |
| 10,459,883 | B1 | 10/2019 | Meiri et al. |
| 10,481,963 | B1 * | 11/2019 | Walker ................ G06F 11/1484 |
| 10,496,489 | B1 | 12/2019 | Chen et al. |
| 10,496,668 | B1 | 12/2019 | Meiri et al. |
| 10,496,672 | B2 | 12/2019 | Meiri et al. |
| 10,565,058 | B1 | 2/2020 | Meiri et al. |
| 10,613,793 | B1 | 4/2020 | Hu et al. |
| 2004/0158588 | A1 * | 8/2004 | Pruet, III .............. G06F 16/273 |
| 2016/0092314 | A1 * | 3/2016 | Crockett ............. G06F 11/1469 714/15 |
| 2016/0366218 | A1 * | 12/2016 | Cors ....................... H04L 67/10 |

OTHER PUBLICATIONS

U.S. Appl. No. 15/499,949, filed Apr. 28, 2017, Chen et al.
U.S. Appl. No. 15/499,951, filed Apr. 28, 2017, Chen et al.
U.S. Appl. No. 15/656,168, filed Jul. 21, 2017, Hu et al.
U.S. Appl. No. 15/656,170, filed Jul. 21, 2017, Chen et al.
U.S. Appl. No. 15/797,324, filed Oct. 30, 2017, Chen et al.
U.S. Appl. No. 16/042,363, filed Jul. 23, 2018, Chen et al.
U.S. Appl. No. 16/038,543, filed Jul. 18, 2018, Chen et al.
U.S. Appl. No. 16/048,767, filed Jul. 30, 2018, Chen et al.
U.S. Appl. No. 16/169,202, filed Oct. 24, 2018, Chen et al.
U.S. Appl. No. 16/177,782, filed Nov. 1, 2018, Hu et al.
U.S. Appl. No. 16/167,868, filed Oct. 23, 2018, Chen et al.
U.S. Appl. No. 16/175,979, filed Oct. 31, 2018, Hu et al.
U.S. Appl. No. 16/157,528, filed Oct. 11, 2018, Chen et al.
U.S. Appl. No. 16/162,786, filed Oct. 17, 2018, Hu et al.
U.S. Appl. No. 16/164,005, filed Oct. 18, 2018, Chen et al.
U.S. Appl. No. 16/264,825, filed Feb. 1, 2019, Chen et al.
U.S. Appl. No. 16/254,899, filed Jan. 23, 2019, Chen et al.
U.S. Appl. No. 16/254,897, filed Jan. 23, 2019, Chen et al.
U.S. Appl. No. 16/264,982, filed Feb. 1, 2019, Chen et al.
U.S. Appl. No. 16/263,414, filed Jan. 31, 2019, Meiri et al.
U.S. Appl. No. 16/375,001, filed Apr. 4, 2019, Chen et al.
U.S. Appl. No. 16/592,271, filed Oct. 3, 2019, Chen et al.
U.S. Appl. No. 16/592,328, filed Oct. 3, 2019, Barabash et al.
U.S. Appl. No. 16/667,453, filed Oct. 29, 2019, Chen et al.
U.S. Appl. No. 16/668,661, filed Oct. 30, 2019, Kronrod et al.
U.S. Appl. No. 16/743,274, filed Jan. 15, 2020, Chen et al.
U.S. Appl. No. 16/747,169, filed Jan. 20, 2020, Chen et al.
U.S. Appl. No. 16/788,422, filed Feb. 10, 2020, Kronrod et al.
U.S. Appl. No. 16/788,461, filed Feb. 12, 2020, Chen et al.
U.S. Appl. No. 16/773,303, filed Jan. 27, 2020, Hu et al.
U.S. Appl. No. 16/511,676, filed Jul. 15, 2019, Chen et al.
U.S. Appl. No. 16/864,272, filed May 1, 2020, Chen et al.

* cited by examiner

300A

MINIMIZING RECOVERY TIME AFTER A HIGH AVAILABILITY EVENT IN A LARGE-SCALE STORAGE SYSTEM

BACKGROUND

In high-performance distributed storage systems, a high availability (HA) event that occurs on a component in the system can result in significant disruption to the system's operations. The goal in a HA event recovery process is to resume an initiator's input/output (TO) request handling as quickly as possible to prevent disconnection of a host from the storage units. In order to realize this goal, during recovery of a failed component, the system needs to be provided with sufficient configuration information to handle IO processes in a timely manner. This presents challenges for a system with synchronous (sync) replication enabled, as modules handling IO servicing must be aware of the sync replication configuration information for each of the volumes it handles (e.g., to enable the modules to determine if the IO to a particular volume should be replicated to a remote storage unit). The issue becomes especially acute in the presence of a large-scale system configuration that supports upwards of a million volumes at any one time.

SUMMARY

This Summary is provided to introduce a selection of concepts in a simplified form that are further described herein in the Detailed Description. This Summary is not intended to identify key features or essential features of the claimed subject matter, nor is it intended to be used to limit the scope of the claimed subject matter.

One aspect may provide a method to minimize recovery time after a high availability (HA) event in a large-scale storage system. The method includes creating, during an active replication session, mini replication session MOM objects from replication session-related configuration information of the active replication session. The mini replication session MOM objects include a subset of parameters needed to configure a data path of a data module in the storage system. The mini replication session MOM objects are created in persistent storage. The method also includes creating, in the persistent storage, mini volume objects for volumes of the active replication session. The mini volume objects include a subset of parameters of volume configuration information needed to configure the data module for the active replication session. Upon determining an occurrence of a high availability event corresponding to the data module, the method includes reconfiguring the mini replication session MOM objects and the mini volume objects prior to activation of the data module and prior to enabling input/output (TO) servicing by the data module. The method further includes performing non-replication IO-related configuration for the data module and, upon completion of the non-replication IO-related configuration, enabling the IO servicing by the data module. The method also includes subsequent to enabling the IO servicing by the data module, loading and reconstructing remaining replication session-related configuration for the data module.

Another aspect may provide a system for minimizing recovery time after a high availability (HA) event in a large-scale storage system. The system includes a memory having computer-executable instructions. The system also includes a processor operated by a storage system. The processor executes the computer-executable instructions. When executed by the processor, the computer-executable instructions cause the processor to perform operations. The operations include creating, during an active replication session, mini replication session MOM objects from replication session-related configuration information of the active replication session. The mini replication session MOM objects include a subset of parameters needed to configure a data path of a data module in the storage system. The mini replication session MOM objects are created in persistent storage. The operations also include creating, in the persistent storage, mini volume objects for volumes of the active replication session. The mini volume objects include a subset of parameters of volume configuration information needed to configure the data module for the active replication session. Upon determining an occurrence of a high availability event corresponding to the data module, the operations include reconfiguring the mini replication session MOM objects and the mini volume objects prior to activation of the data module and prior to enabling input/output (TO) servicing by the data module. The operations also include performing non-replication IO-related configuration for the data module and, upon completion of the non-replication IO-related configuration, enabling the IO servicing by the data module. The operations also include subsequent to enabling the IO servicing by the data module, loading and reconstructing remaining replication session-related configuration for the data module.

Another aspect may provide a computer program product embodied on a non-transitory computer readable medium. The computer program product includes instructions that, when executed by a computer at a storage system, causes the computer to perform operations. The operations include creating, during an active replication session, mini replication session MOM objects from replication session-related configuration information of the active replication session. The mini replication session MOM objects include a subset of parameters needed to configure a data path of a data module in the storage system. The mini replication session MOM objects are created in persistent storage. The operations also include creating, in the persistent storage, mini volume objects for volumes of the active replication session. The mini volume objects include a subset of parameters of volume configuration information needed to configure the data module for the active replication session. Upon determining an occurrence of a high availability event corresponding to the data module, the operations include reconfiguring the mini replication session MOM objects and the mini volume objects prior to activation of the data module and prior to enabling input/output (TO) servicing by the data module. The operations also include performing non-replication IO-related configuration for the data module and, upon completion of the non-replication IO-related configuration, enabling the IO servicing by the data module. The operations also include subsequent to enabling the IO servicing by the data module, loading and reconstructing remaining replication session-related configuration for the data module.

BRIEF DESCRIPTION OF THE DRAWING FIGURES

Objects, aspects, features, and advantages of embodiments disclosed herein will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features. For clarity, not every element may be labeled in every figure. The drawings are not necessarily to scale, emphasis instead being placed upon illustrating embodiments, principles, and concepts. The drawings are not meant to limit the scope of the claims included herewith.

DETAILED DESCRIPTION

Figure 1:
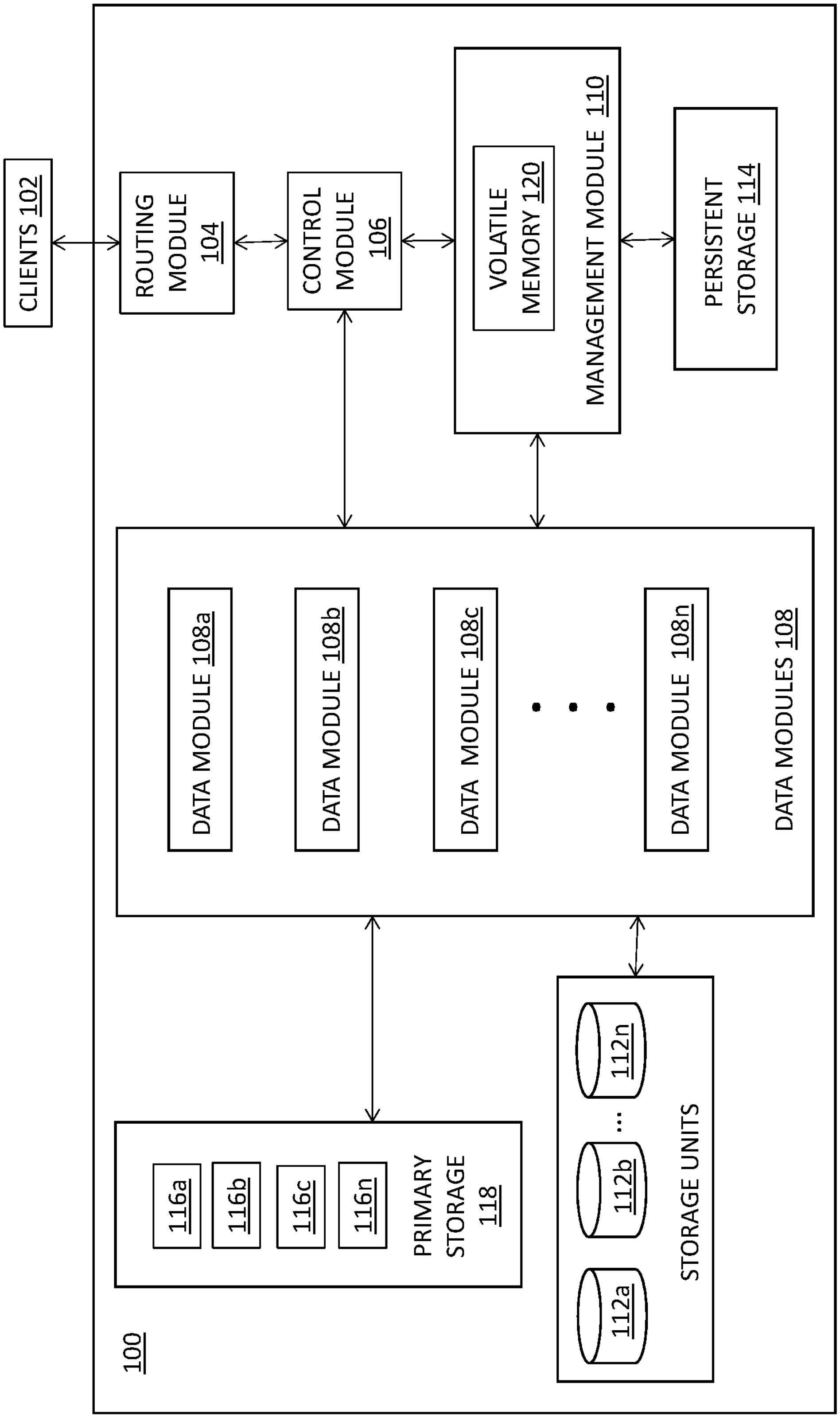
FIG. 1 is a block diagram illustrating one example of a content-based storage system configured for minimizing recovery time after a high availability event in accordance with an embodiment.

Embodiments described herein provide a technique for minimizing recovery time after a high availability (HA) event in a large-scale storage system. The embodiments provide a technique that allows fast re-configuration of one or more failed components following a HA event on a large-scale system with sync replication. This re-configuration technique significantly reduces IO hiccups and prevents host disconnection from storage units after the event.

Before describing embodiments of the concepts, structures, and techniques sought to be protected herein, some terms are explained. The following description includes a number of terms for which the definitions are generally known in the art. However, the following glossary definitions are provided to clarify the subsequent description and may be helpful in understanding the specification and claims.

As used herein, the term "storage system" is intended to be broadly construed so as to encompass, for example, private or public cloud computing systems for storing data as well as systems for storing data comprising virtual infrastructure and those not comprising virtual infrastructure. As used herein, the terms "client," "host," and "user" refer, interchangeably, to any person, system, or other entity that uses a storage system to read/write data, as well as issue requests for configuration of storage units in the storage system. In some embodiments, the term "storage device" may also refer to a storage array including multiple storage devices. In certain embodiments, a storage medium may refer to one or more storage mediums such as a hard drive, a combination of hard drives, flash storage, combinations of flash storage, combinations of hard drives, flash, and other storage devices, and other types and combinations of computer readable storage mediums including those yet to be conceived. A storage medium may also refer both physical and logical storage mediums and may include multiple level of virtual to physical mappings and may be or include an image or disk image. A storage medium may be computer-readable, and may also be referred to herein as a computer-readable program medium. Also, a storage unit may refer to any unit of storage including those described above with respect to the storage devices, as well as including storage volumes, logical drives, containers, or any unit of storage exposed to a client or application. A storage volume may be a logical unit of storage that is independently identifiable and addressable by a storage system.

In certain embodiments, the term "TO request" or simply "TO" may be used to refer to an input or output request, such as a data read or data write request or a request to configure and/or update a storage unit feature. A feature may refer to any service configurable for the storage system.

In certain embodiments, a storage device may refer to any non-volatile memory (NVM) device, including hard disk drives (HDDs), solid state drivers (SSDs), flash devices (e.g., NAND flash devices), and similar devices that may be accessed locally and/or remotely (e.g., via a storage attached network (SAN) (also referred to herein as storage array network (SAN)).

In certain embodiments, a storage array (sometimes referred to as a disk array) may refer to a data storage system that is used for block-based, file-based or object storage, where storage arrays can include, for example, dedicated storage hardware that contains spinning hard disk drives (HDDs), solid-state disk drives, and/or all-flash drives. Flash, as is understood, is a solid-state (SS) random access media type that can read any address range with no latency penalty, in comparison to a hard disk drive (HDD) which has physical moving components which require relocation when reading from different address ranges and thus significantly increasing the latency for random IO data. An exemplary content addressable storage (CAS) array is described in commonly assigned U.S. Pat. No. 9,208,162 (hereinafter "'162 patent"), which is hereby incorporated by reference).

In certain embodiments, a data storage entity may be any one or more of a file system, object storage, a virtualized device, a logical unit, a logical unit number, a logical volume, a logical device, a physical device, and/or a storage medium.

In certain embodiments, a logical unit (LU) may be a logical entity provided by a storage system for accessing data from the storage system, and as used herein a logical unit is used interchangeably with a logical volume. In many embodiments herein, a LU or LUN (logical unit number) may be used interchangeable for each other. In certain embodiments, a LUN may be a logical unit number for identifying a logical unit; may also refer to one or more virtual disks or virtual LUNs, which may correspond to one or more Virtual Machines.

In certain embodiments, a data protection strategy that can be advantageous for use with computer systems, especially networked storage systems, is checkpointing. A checkpoint, as used herein, contains a consistent point in time image of an entire system, including configuration, logical volume mapping metadata, physical on disk layout metadata, and actual user data. In certain embodiments, a checkpoint preserves the state of a system at a given point in time by saving one or more snapshots of, for example, a file system, or an application at one or more points in time.

While vendor-specific terminology may be used herein to facilitate understanding, it is understood that the concepts, techniques, and structures sought to be protected herein are not limited to use with any specific commercial products. In addition, to ensure clarity in the disclosure, well-understood methods, procedures, circuits, components, and products are not described in detail herein.

The phrases, "such as," "for example," "e.g.," "exemplary," and variants thereof, are used herein to describe non-limiting embodiments and are used herein to mean "serving as an example, instance, or illustration." Any embodiments herein described via these phrases and/or variants are not necessarily to be construed as preferred or advantageous over other embodiments and/or to exclude the incorporation of features from other embodiments. In addition, the word "optionally" is used herein to mean that a feature or process, etc., is provided in some embodiments and not provided in other embodiments. Any particular embodiment of the invention may include a plurality of "optional" features unless such features conflict.

As described above, the embodiments described herein provide a technique for minimizing recovery time after one or more high availability (HA) events in a large-scale storage system. The embodiments provide a technique that allows fast re-configuration of a failed component following a HA event on a large-scale system with sync or metro replication. This re-configuration technique significantly reduces IO hiccups and prevents host disconnection from storage units after the event.

The embodiments provide a way to minimize the recovery time prior to enabling IO services after the HA event through the use of derived mini objects (MOM objects) for a replication session and mini volumes having minimal information that is needed for enabling sync or metro replication IO in a data path. These mini objects are created and maintained only for sessions operating in sync or metro replication mode, which can greatly reduce the amount of potential mini objects needed for recovery. As the scale requirements for the amount of volumes actively participating in sync replication are significantly smaller than for other modes of replication, instead of operating with a large number (e.g., a million) volumes for a system wide configuration, the process will be able to maintain a much lesser number (e.g., thousands) of mini volumes in sync mode. This, together with a smaller mini object footprint, can eventually lead to faster mini objects reconstructed in the system's database and faster data path reconfiguration.

Turning now to FIG. 1, a content-addressable storage system for minimizing recovery time after a HA event will now be described. FIG. 1 shows a content-addressable storage system 100 (referred to herein as "storage system") according to an illustrative embodiment. For purposes of illustration, the system 100 is described herein as performing replication sessions in sync mode. However, it will be understood that the system 100 may alternatively operate in metro, or active/active, mode in order to realize the advantages of the embodiments described herein. In one embodiment, the system may operate in asynchronous (async) mode and switch over to sync or metro mode before performing at least some of the processes described herein.

The storage system 100 may include a plurality of modules 104, 106, 108, and 110, a plurality of storage units 112*a*-112*n*, which may be implemented as a storage array, and a primary storage 118. In some embodiments, the storage units 112*a*-112*n* may be provided as, e.g., storage volumes, logical drives, containers, or any units of storage that are exposed to a client or application (e.g., one of clients 102).

In one embodiment, modules 104, 106, 108, and 110 may be provided as software components, e.g., computer program code that, when executed on a processor, may cause a computer to perform functionality described herein. In a certain embodiment, the storage system 100 includes an operating system (OS) (shown generally in FIG. 5), and the one or more of the modules 104, 106, 108, and 110 may be provided as user space processes executable by the OS. In other embodiments, one or more of the modules 104, 106, 108, and 110 may be provided, at least in part, as hardware, such as digital signal processor (DSP) or an application specific integrated circuit (ASIC) configured to perform functionality described herein. It is understood that the modules 104, 106, 108, and 110 may be implemented as a combination of software components and hardware components. While only a single routing module 104 and control module 106 are shown in FIG. 1, it will be understood that any number of such modules may be employed to realize the advantages of the embodiments described herein.

The routing module 104 may be configured to terminate storage and retrieval operations and distribute commands to the control module 106 that may be selected for the operation in such a way as to retain balanced usage within the system. The routing module 104 can route read/write commands from a client (e.g., one of clients 102) to the control module 106 and data modules 108*a*-108*n* (collectively referred to herein as data modules 108) for execution. The routing module 104 may route SCSI IO requests to the control module 106 for execution and returns results to the clients. In embodiments, data content-based mapping to physical storage can distribute workloads relatively evenly and provide separation of the control and data paths.

The control module 106 may control execution of read and write commands to the storage units 112*a*-112*n*. The data modules 108 may be connected to the storage units 112*a*-112*n* 112 and, under control of the respective control module 106, may pass data to and/or from the storage units 112*a*-112*n* via suitable storage drivers (not shown). The control module 106 may also maintain and manage key metadata elements. In certain embodiments, the control module 106 receives an IO request from the routing module 104, e.g., on a certain sub-LUN (SL), guaranteeing its atomic execution (i.e., execution independent of other processes) and returns the result to the routing module 104. The control module 104 also communicates with the data modules 108 to execute the IO requests.

As shown in FIG. 1, data modules 108*a*-108*n* are communicatively coupled to the control module 106 and the management module 110. In embodiments, the data modules 108 are configured to perform the actual read/write (R/W) operations by accessing the storage units 112*a*-112*n* attached to them. The data modules 108 may maintain metadata related with the physical location of data blocks. In certain embodiments, the data modules 108 may be responsible for functions, such as maintaining a set of LUNs which are attached locally (e.g., via storage units 112*a*-112*n*) and performing all 10 operations on these LUNs, managing the physical layout of the attached LUNs, managing the mapping between X-Page Data hash digests and their physical locations in a persistent way, managing deduplication of X-Page Data in a persistent way; and receiving disk 10 requests from control modules 106, performing them and returning a result.

As indicated above, the data modules 108 perform read/write operations with respect to one or more storage units 112*a*-112*n*. In embodiments, the storage system 100 performs replication sessions in sync or metro replication mode in which one or more of the storage units 112*a*-112*n* may be considered source devices and others of the storage units 112*a*-112*n* may be considered target devices to which data is replicated from the source devices.

The management module 110 may be configured to monitor and track the status of various hardware and software resources within the storage system 100. In some embodiments, the management module 110 may manage the allocation of memory by other modules (e.g., routing module 104, control module 106, and data modules 108). In some embodiments, the management module 110 is configured to monitor the other modules and use this information to determine when the storage system 100 may begin processing client IO operations after a restart, as will be described further herein.

In embodiments, the management module 110 initiates recovery operations in response to a HA event. The management module 110 maintains a configuration repository in a persistent storage 114 that stores configuration information, such as information related to replication sessions, volumes, etc. This configuration information is described further herein. The persistent storage 114 may be a separate storage unit that is attached to the management module 110, as shown in FIG. 1 for ease of description, or may be integrated with one or more of the storage units 112*a*-112*n* of FIG. 1. In addition, the management module 110 may include a volatile memory 120 to which configuration information from the configuration repository is loaded in response to a HA event. In particular, when a restart of the management module 110 is performed, mini objects created by the system during the active replication session are provided to the virtual memory 120 in a first phase of a recovery operation, followed by other configuration information as part of a second phase of the recovery operation. These mini objects are described further herein. The volatile memory 120 is provided in the management module 110, as shown in FIG. 1.

The primary memory 118 can be any type of memory having access times that are faster compared to the storage units 112*a*-112*n*. In some embodiments, primary memory 118 may be provided as dynamic random-access memory (DRAM). In certain embodiments, primary memory 118 may be provided as synchronous DRAM (SDRAM). In one embodiment, primary memory 118 may be provided as double data rate SDRAM (DDR SDRAM), such as DDR3 SDRAM. These differing types of memory are shown generally in FIG. 1 as 116*a*-116*n*.

In some examples, the system 100 may employ more than a single type of memory technology, including a mix of more than one Flash technology (e.g., single level cell (SLC) flash and multilevel cell (MLC) flash), and a mix of Flash and DRAM technologies. In certain embodiments, data mapping may optimize performance and life span by taking advantage of the different access speeds and different write/erase cycle limitations of the various memory technologies.

Figure 2:
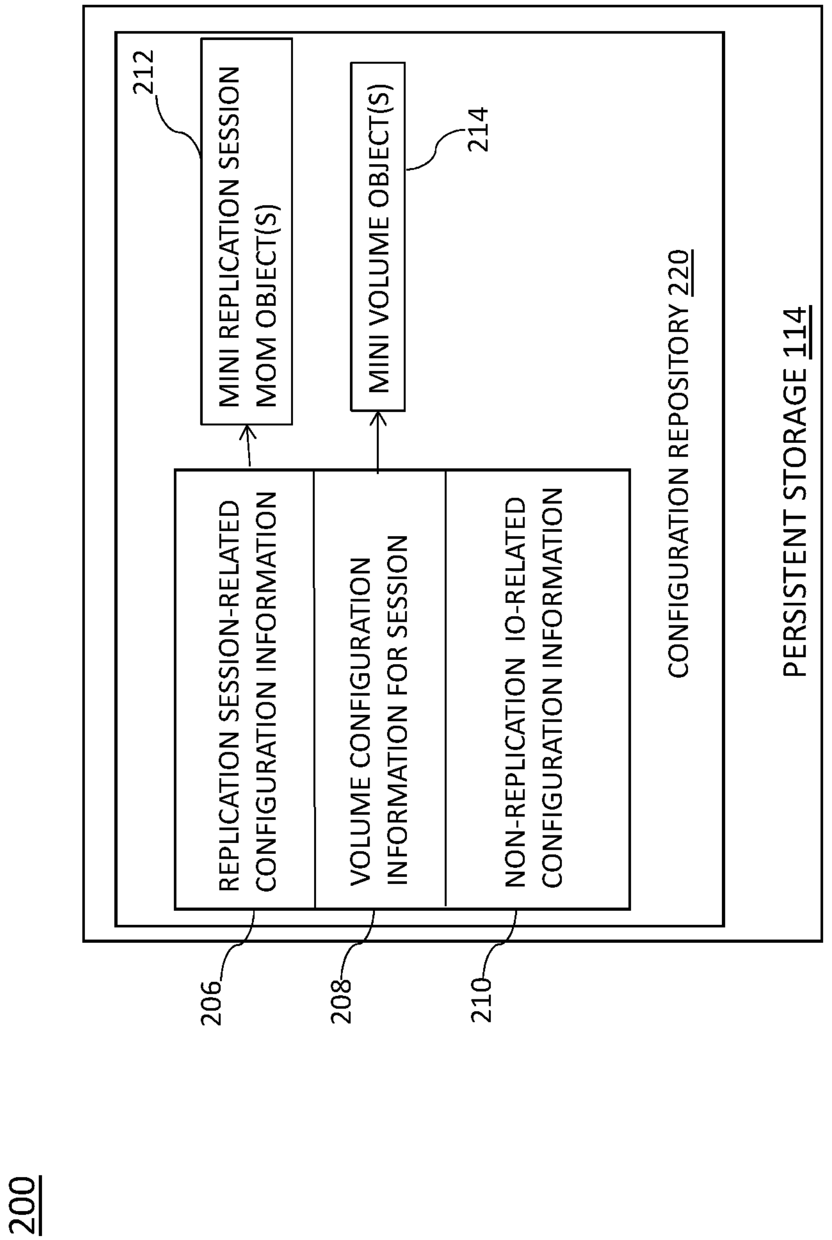
FIG. 2 depicts a persistent storage and a configuration repository of the content-based storage system of FIG. 1 in accordance with an embodiment.

Turning now to FIG. 2, the persistent storage and configuration repository of the content-based storage system for use in minimizing recovery time after a HA event will now be described. Configuration information stored in the persistent storage 114 may be stored in a configuration repository 220 and includes replication session-related configuration information 206 and non-replication IO-related configuration information 210 (e.g., configuration information for 10 services). In addition, the configuration information includes configuration information about the volumes 208 associated with the active replication session.

Examples of replication session-related configuration information 206 include consistency group information, mappings between replication cycle numbers and corresponding snapsets, and remote system information to which data is transferred as part of the replication process, to name a few. Examples of non-replication IO-related configuration information 210 include snap tree structures, LUN mappings, etc. Configuration information for the volumes 208 associated with the active replication session includes, e.g., configuration information that enables data path modules to service 10 requests from initiators.

As shown in FIG. 2, during an active sync or metro replication session, mini objects, which are created for use in implementing a fast recovery after a HA event, may be stored in the configuration repository 220 in the persistent memory 114. These mini objects include mini replication session MOM objects 212 and mini volume objects 214, each of which consists of a portion of the configuration information (from the configuration repository 220) that is considered essential for reconfiguring a system component or process in order to enable a sync replication session to be established after the HA event.

Examples of essential mini replication session MOM objects 212 that are essential to reconfigure and enable a sync replication session include parameters of remote storage systems to the data that should be mirrored as part of sync replication (remote system IDs and/or pairing labels used to identify a specific replication session in local and remote storage systems. Examples of mini volume objects 214 considered to be essential for reconfiguring and enable a sync replication session include volume pairing labels used by both local and remote storage systems to identify a volume within the storage array and/or volume external IDs as seen by initiators.

Figure 3A:
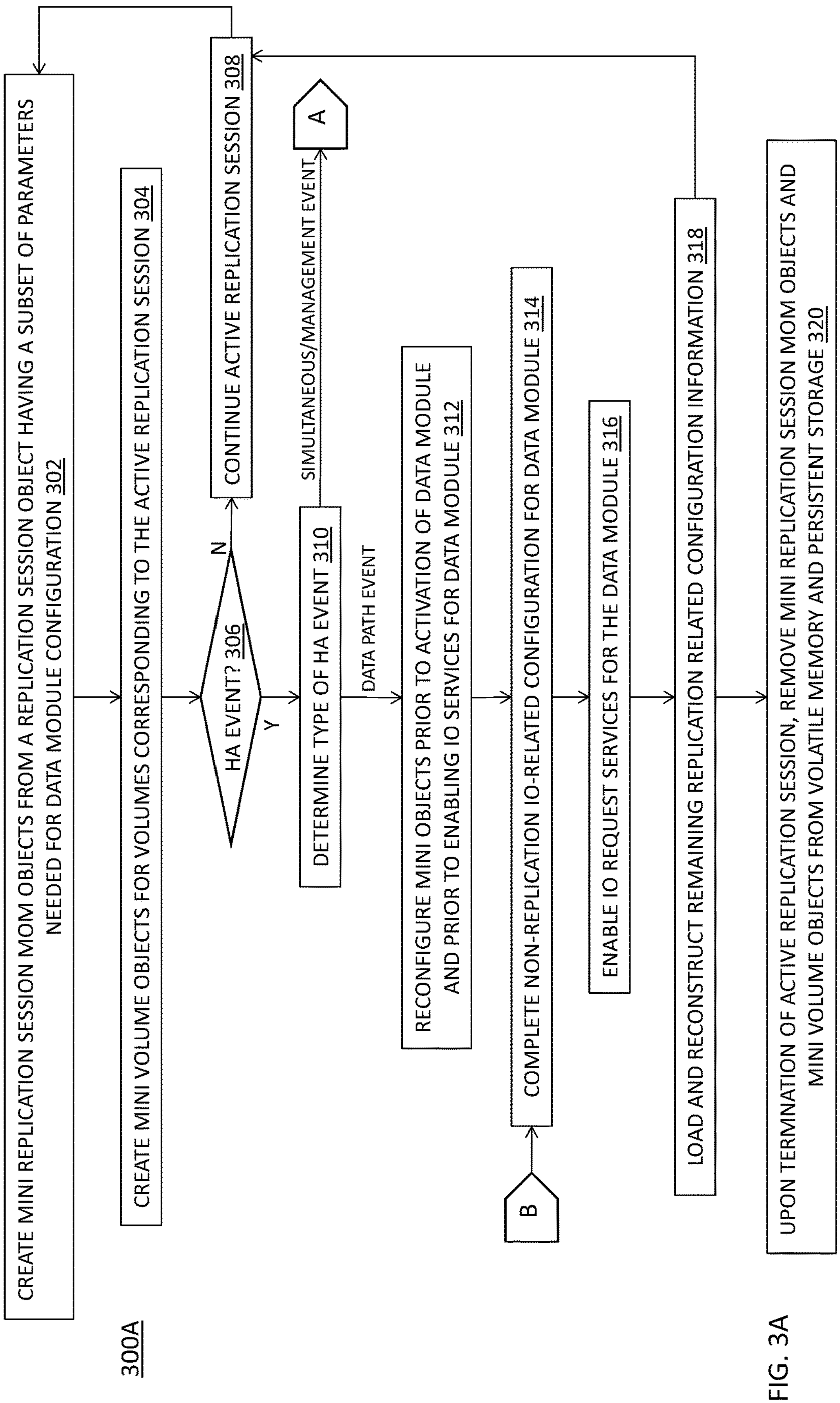
FIGS. 3A-3B are flow diagrams illustrating a process for minimizing recovery time after a high availability event in a large-scale storage system in accordance with an embodiment.
Figure 3B:
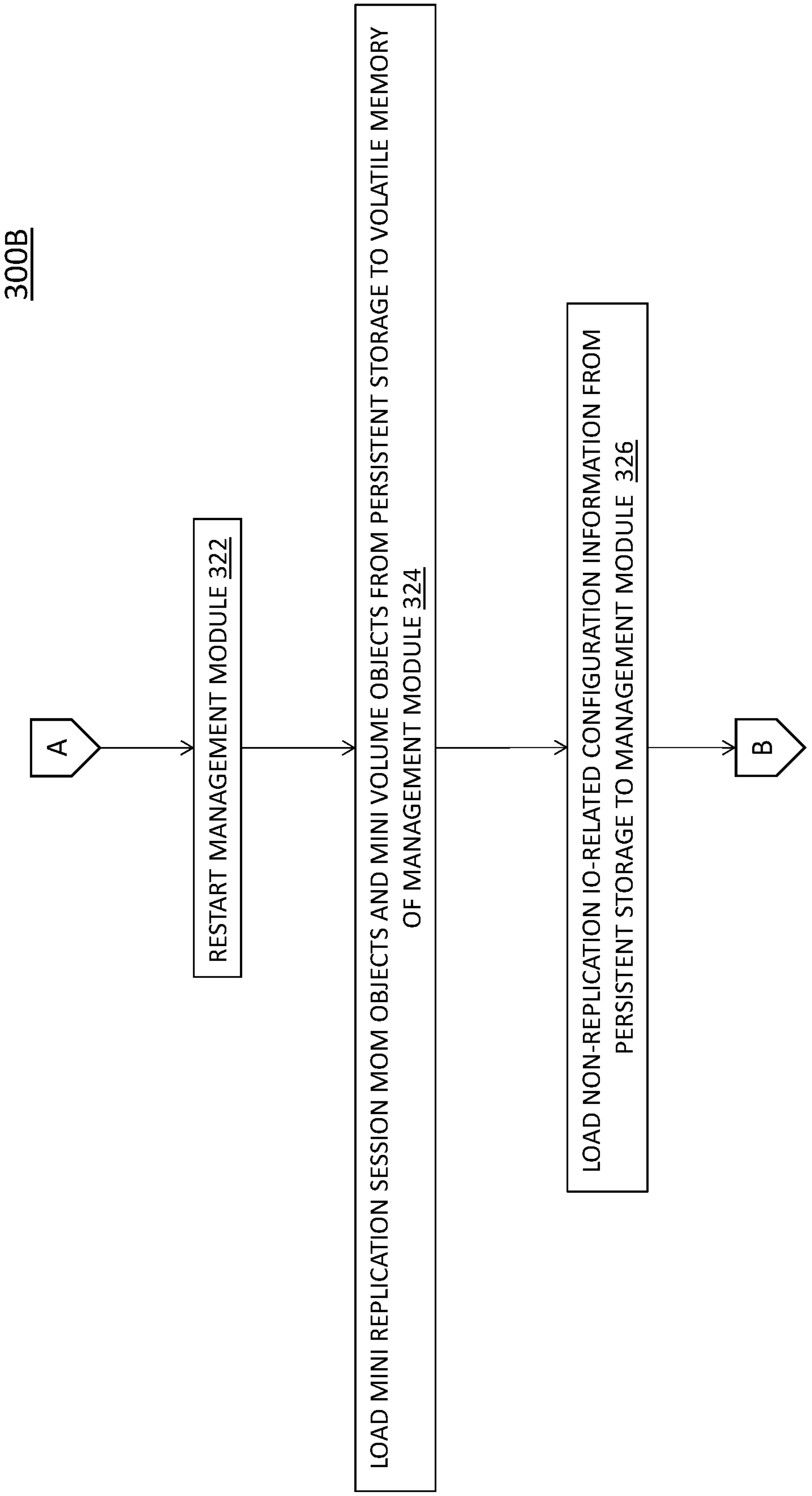

Turning now to FIGS. 3A-3B, flow diagrams 300A-300B for minimizing recovery time after a HA event in a storage system (e.g., the storage system 100 of FIG. 1) during an active replication session will now be described in accordance with an embodiment. The processes of FIGS. 3A-3B assume, for purposes of illustration, that the active replication session is implemented in synchronous replication mode. It will be understood that the active replication session may alternatively be conducted in metro mode. The processes of FIGS. 3A-3B provide a first phase of recovery and a second phase of recovery, as will be described further herein.

In block 302, mini replication session MOM objects 212 are created from replication session-related configuration information 206 (e.g., a replication session object) of the active replication session. The mini replication session MOM objects 212 include a subset of parameters needed to configure a data path of a failed data module in the storage system after a HA event. The mini replication session MOM objects 212 are stored in persistent storage 114, as shown in FIGS. 1 and 2. In block 304, mini volume objects 214 for volumes of the active replication session are created and stored in the persistent storage 114, as shown in FIGS. 1 and 2.

In block 306, it is determined whether a HA event has occurred in the system. If not, the active replication session continues in block 308 and the process returns to block 302. Otherwise, if a HA event has occurred in block 306, the type of HA event is determined in block 310.

The process described in the flow diagram 300A of FIG. 3A continues if the HA event is determined to correspond to a data path event (e.g., one of the data modules 108 of FIG. 1 has failed). If the HA event is determined to be a simultaneous event (e.g., both management module 110 and a data module have failed), the process 300A from block 310 continues to the flow diagram 300B of FIG. 3B.

Figure 4:
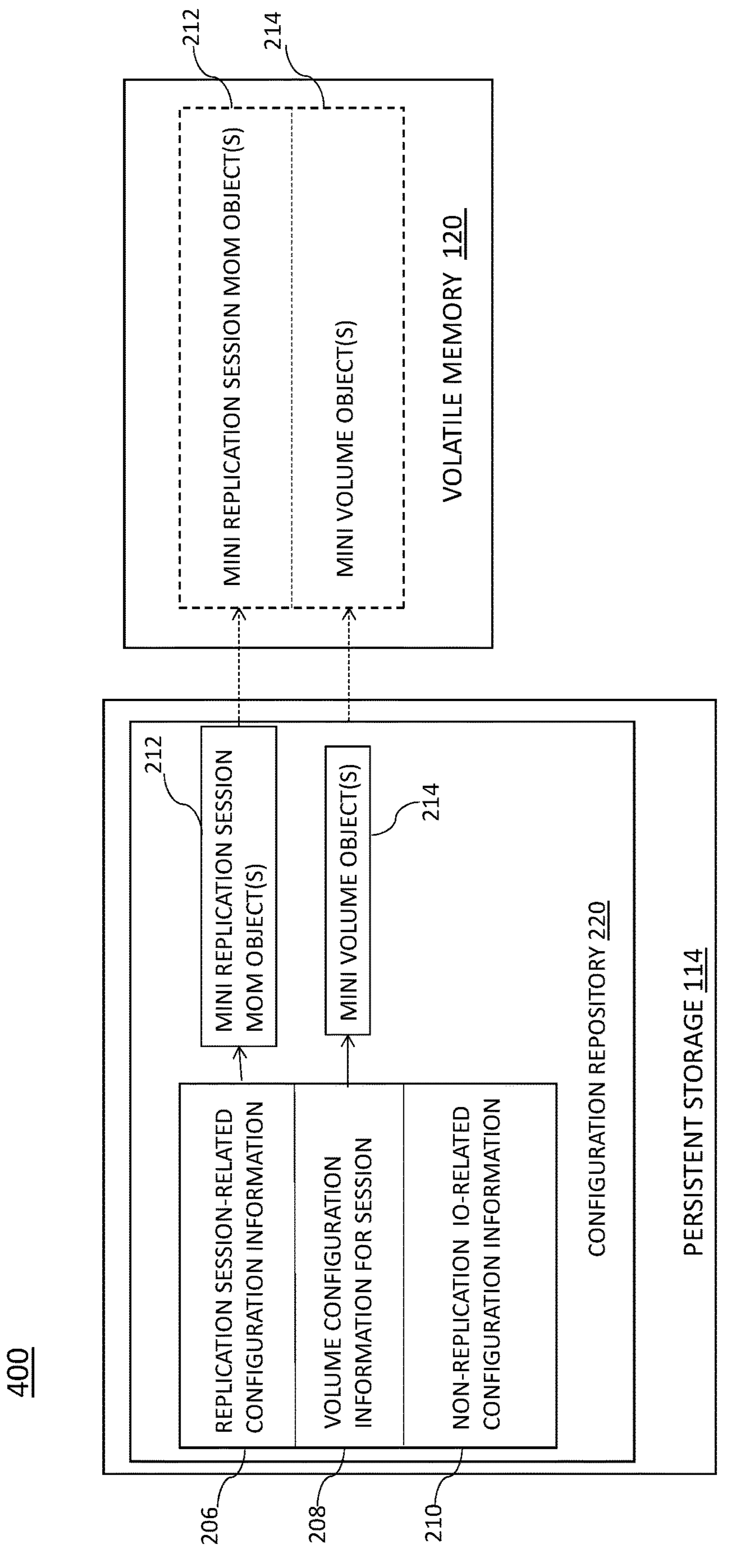
FIG. 4 depicts a persistent storage and a volatile memory of the content-based storage system of FIG. 1 in accordance with an embodiment.

Returning to block 310, if the HA event is a data path failure with respect to one of the data modules 108, in block 312, as part of a first phase of recovery, the mini replication session MOM objects 212 and the mini volume objects 214 are reconfigured prior to activation of the failed data module and prior to enabling the failed data module to continue servicing 10 requests. Reconfiguration includes data path module configuration upon a HA event on that data path module. The module is configured with information required for handling 10 operations, e.g., LUN mapping, if the volume is part of sync replication, remote storage system information to which data should be replicated in the case of sync replication. As shown in FIG. 4, mini objects 212 and 214 are loaded from persistent memory 114 to the volatile memory 120 of the management module 110.

All non-replication IO-related configuration for the failed data module is performed in block 314. Once the non-replication IO-related configuration for the data module has been completed, the IO servicing for the data module is enabled in block 316. In block 318, as part of a second phase of recovery, any remaining replication-related configuration for the data module is loaded and reconstructed (e.g., remaining replication-related configuration information stored as 206 in persistent storage that is left after the mini replication session MOM objects 212 have been created). This remaining replication-related configuration information can be loaded and reconstructed 'lazily' in the background, that is, during 10 servicing by the data module. In this manner, disruption to the active replication session is minimized as the IO servicing is enabled sooner (as part of a recovery first phase) rather than after all replication session- and non-replication session-configuration is performed.

10 servicing by the data module continues for the active replication session, and the process 300A returns to block 308. In block 320, upon termination of the active replication session, the mini replication session MOM objects 212 and the mini volume objects 214 are removed from the volatile memory 120 and the persistent storage 114 in order to minimize the amount of memory used to store configuration information.

Returning to block 310, if the HA event is determined to be a simultaneous HA event that includes a failed management module 110 along with one of the data modules 108, the process 300A continues to process 300B of FIG. 3B. In process 300B, the management module 110 is restarted in block 322. In block 324, the mini replication session MOM objects 212 and the mini volume objects 214 that were created in blocks 302/304 are loaded at the beginning of a repository load, e.g., from the configuration repository 220 of FIG. 2 to the volatile memory 120. As shown in FIG. 4, As shown in FIG. 4, mini objects 212 and 214 are loaded from persistent memory 114 to the volatile memory 120 of the management module 110.

In block 326, non-replication IO-related configuration 210 is loaded from the configuration repository to the volatile memory 120. The process 300B then returns to block 314 of FIG. 3A.

Figure 5:
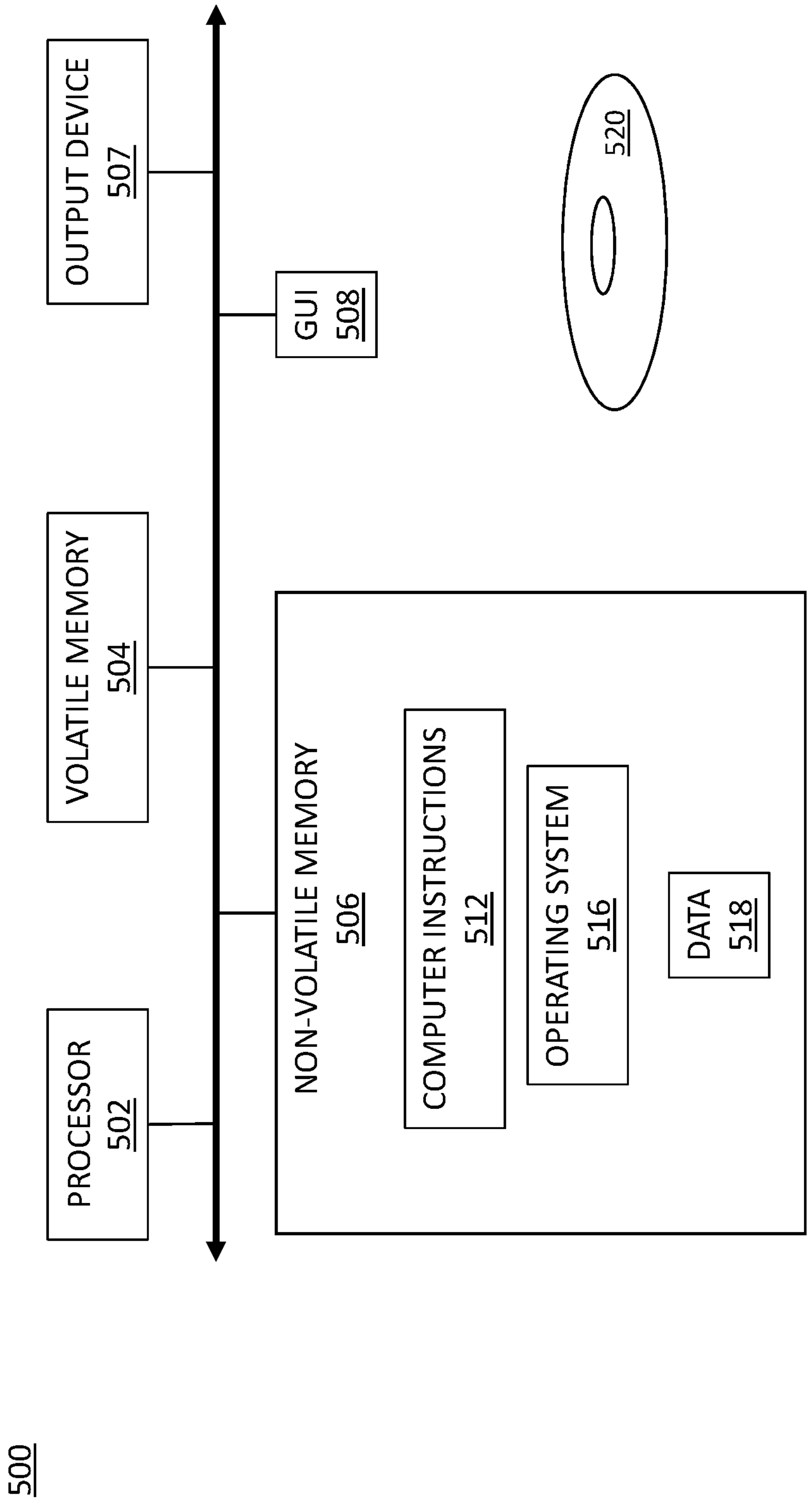
FIG. 5 is a block diagram of an illustrative computer that can perform at least a portion of the processing described herein.

FIG. 5 shows an exemplary computer 500 (e.g., physical or virtual) that can perform at least part of the processing described herein. The computer 500 includes a processor 502, a volatile memory 504, a non-volatile memory 506 (e.g., hard disk or flash), an output device 507 and a graphical user interface (GUI) 508 (e.g., a mouse, a keyboard, a display, for example). The non-volatile memory 506 stores computer instructions 512, an operating system 516 and data 518. In one example, the computer instructions 512 are executed by the processor 502 out of volatile memory 504. In one embodiment, an article 520 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Having described exemplary embodiments of the invention, it will now become apparent to one of ordinary skill in the art that other embodiments incorporating their concepts may also be used. The embodiments contained herein should not be limited to the disclosed embodiments but rather should be limited only by the spirit and scope of the appended claims. All publications and references cited herein are expressly incorporated herein by reference in their entirety.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

We claim:

1. A method for minimizing recovery time after a high availability (HA) event in a storage system, the method comprising:

during an active replication session, creating in persistent storage mini replication session MOM objects from replication session-related configuration information of the active replication session, the mini replication session MOM objects including a subset of parameters needed to configure a data path of a data module in the storage system; and creating in the persistent storage mini volume objects for volumes of the active replication session, the mini volume objects including a subset of parameters of volume configuration information needed to configure the data module for the active replication session; and upon determining an occurrence of a HA event corresponding to the data module, the HA event causing a failure of the data module, prior to activation of the failed data module and prior to enabling input/output (IO) servicing by the failed data module, reconfiguring the failed data module based on the mini replication session MOM objects and the mini volume objects;

performing non-replication IO-related configuration for the failed data module and, upon completion of the non-replication IO-related configuration, enabling the IO servicing by the failed data module; and subsequent to enabling the IO servicing by the failed data module, loading and reconstructing remaining replication session-related configuration other than the enabled IO servicing for the failed data module.

2. The method of claim 1, further comprising:

determining the high availability event also corresponds to a management module of the storage system, the method further comprising:

upon restart of the management module, and prior to reconfiguring the mini replication session MOM objects and the mini volume objects, loading the mini replication session MOM objects and the mini volume objects at a beginning of a repository load from the persistent storage; and loading non-replication IO-related configuration information.

3. The method of claim 1, further comprising:

upon termination of the active replication session, removing the mini replication session MOM objects and the mini volume objects from volatile memory and the persistent storage.

4. The method of claim 1, wherein the active replication session is implemented in one of synchronous replication mode and metro replication mode.

5. The method of claim 1, wherein the mini replication session MOM objects include:

parameters of remote storage systems to data that is to be mirrored as part of the active replication session, the parameters including at least one of remote system identifiers (IDs) and pairing labels used to identify the active replication session in local storage systems and the remote storage systems.

6. The method of claim 1, wherein the mini volume objects include at least one of:

volume pairing labels used by both local storage systems and remote storage systems to identify a volume within a storage array; and volume external identifiers (IDs) as seen by initiators.

7. A system for minimizing recovery time after a high availability (HA) event in a storage system, the system comprising:

a memory comprising computer-executable instructions; and a processor operable by a storage system, the processor executing the computer-executable instructions, the computer-executable instructions when executed by the processor cause the processor to perform operations comprising:

during an active replication session, creating in persistent storage mini replication session MOM objects from replication session-related configuration information of the active replication session, the mini replication session MOM objects including a subset of parameters needed to configure a data path of a data module in the storage system; and creating in the persistent storage mini volume objects for volumes of the active replication session, the mini volume objects including a subset of parameters of volume configuration information needed to configure the data module for the active replication session; and upon determining an occurrence of a high availability HA event corresponding to the data module, the HA event causing a failure of the data module, prior to activation of the failed data module and prior to enabling input/output (IO) servicing by the failed data module, reconfiguring the failed data module based on the mini replication session MOM objects and the mini volume objects;

performing non-replication IO-related configuration for the failed data module and, upon completion of the non-replication IO-related configuration, enabling the IO servicing by the failed data module; and subsequent to enabling the IO servicing by the failed data module, loading and reconstructing remaining replication session-related configuration other than the enabled IO servicing for the failed data module.

8. The system of claim 7, wherein the high availability event also corresponds to a management module of the storage system, the operations further comprising:

upon restart of the management module, and prior to reconfiguring the mini replication session MOM objects and the mini volume objects, loading the mini replication session MOM objects and the mini volume objects at a beginning of a repository load from the persistent storage; and loading non-replication IO-related configuration information.

9. The system of claim 7, wherein upon termination of the active replication session, the operations further comprise removing the mini replication session MOM objects and the mini volume objects from volatile memory and the persistent storage.

10. The system of claim 7, wherein the active replication session is implemented in one of synchronous replication mode and metro replication mode.

11. The system of claim 7, wherein the mini replication session MOM objects include:

parameters of remote storage systems to data that is to be mirrored as part of the active replication session, the parameters including at least one of remote system identifiers (IDs) and pairing labels used to identify the active replication session in local storage systems and the remote storage systems.

12. The system of claim 7, wherein the mini volume objects include at least one of:

volume pairing labels used by both local storage systems and remote storage systems to identify a volume within a storage array; and volume external identifiers (IDs) as seen by initiators.

13. A computer program product embodied on a non-transitory computer readable medium, the computer program product including instructions that, when executed by a computer, causes the computer to perform operations comprising:

during an active replication session at a storage system, creating in persistent storage mini replication session MOM objects from replication session-related configuration information of the active replication session, the mini replication session MOM objects including a subset of parameters needed to configure a data path of a data module in the storage system; and creating in the persistent storage mini volume objects for volumes of the active replication session, the mini volume objects including a subset of parameters of volume configuration information needed to configure the data module for the active replication session; and upon determining an occurrence of a high availability (HA) event corresponding to the data module, the HA event causing a failure of the data module, prior to activation of the failed data module and prior to enabling input/output (IO) servicing by the failed data module, reconfiguring the failed data module based on the mini replication session MOM objects and the mini volume objects;

performing non-replication IO-related configuration for the failed data module and, upon completion of the non-replication IO-related configuration, enabling the IO servicing by the failed data module; and subsequent to enabling the IO servicing by the failed data module, loading and reconstructing remaining replication session-related configuration other than the enabled IO servicing for the failed data module.

14. The computer program product of claim 13, wherein the high availability event also corresponds to a management module of the storage system, the operations further comprising:

upon restart of the management module, and prior to reconfiguring the mini replication session MOM objects and the mini volume objects, loading the mini replication session MOM objects and the mini volume objects at a beginning of a repository load from the persistent storage; and loading non-replication IO-related configuration information.

15. The computer program product of claim 13, wherein upon termination of the active replication session, the operations further comprise removing the mini replication session MOM objects and the mini volume objects from the volatile memory and the persistent storage.

16. The computer program product of claim 13, wherein the active replication session is implemented in one of synchronous replication mode and metro replication mode.

17. The computer program product of claim 13, wherein the mini replication session MOM objects include:

parameters of remote storage systems to data that is to be mirrored as part of the active replication session, the parameters including at least one of remote system identifiers (IDs) and pairing labels used to identify the active replication session in local storage systems and the remote storage systems.

18. The computer program product of claim 13, wherein the mini volume objects include at least one of:

volume pairing labels used by both local storage systems and remote storage systems to identify a volume within a storage array; and volume external identifiers (IDs) as seen by initiators.

* * * * *